Dec. 28, 1943.    R. G. LE TOURNEAU    2,337,670
PORTABLE TURNTABLE
Filed Oct. 25, 1941    2 Sheets-Sheet 1

INVENTOR
R. G. LeTourneau
BY
ATTYS

Dec. 28, 1943.   R. G. LE TOURNEAU   2,337,670
PORTABLE TURNTABLE
Filed Oct. 25, 1941   2 Sheets-Sheet 2
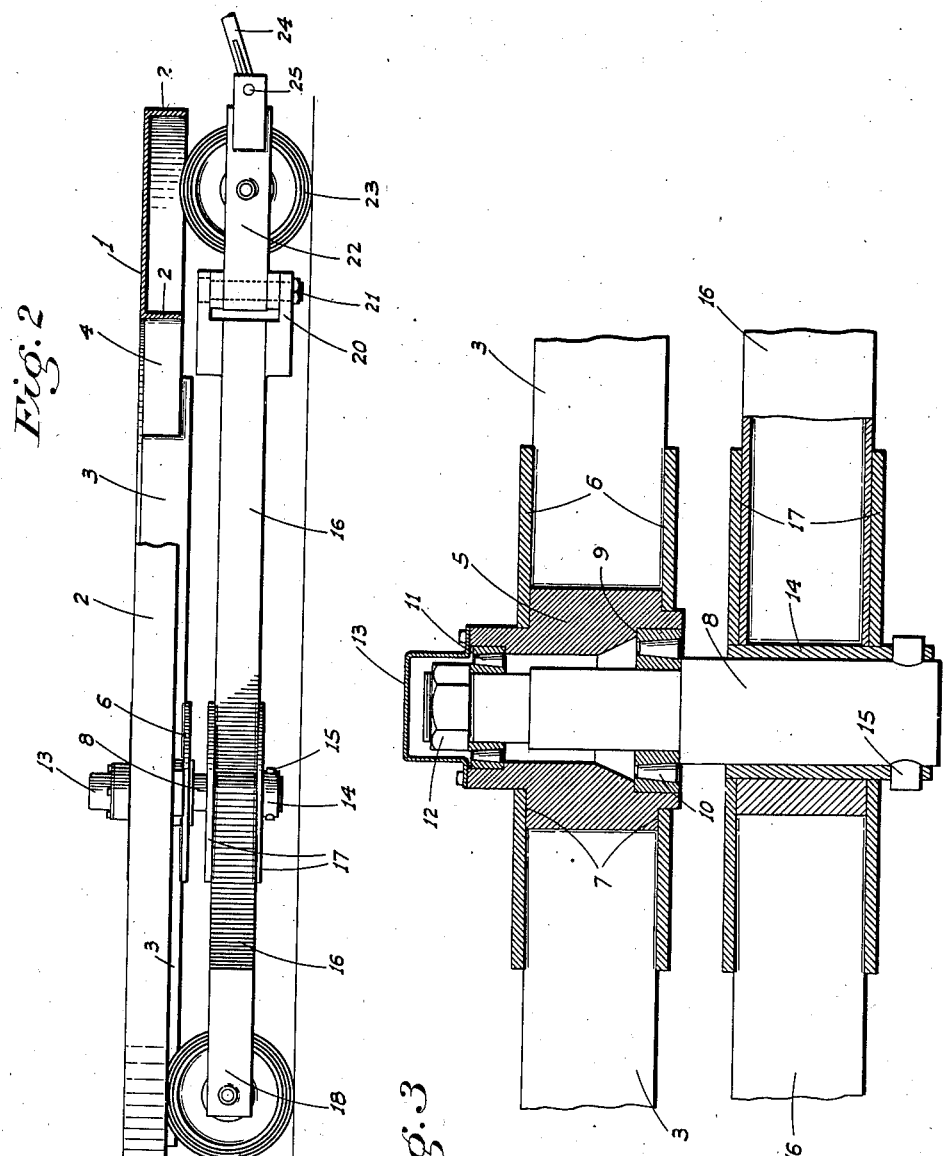
INVENTOR
R. G. LeTourneau
BY
ATTYS Patented Dec. 28, 1943

2,337,670

UNITED STATES PATENT OFFICE 2,337,670

PORTABLE TURNTABLE

Robert G. Le Tourneau, Peoria, Ill., assignor to R. G. Le Tourneau, Inc., a corporation Application October 25, 1941, Serial No. 416,513

4 Claims. (Cl. 280—49)

This invention relates in general to an industrial turntable, and in particular the invention is directed to, and it is the principal object to provide, an industrial turntable arranged in combination with a portable wheel supported frame whereby the turntable may be moved from place to place as occasion demands.

Another object of the invention is to provide a portable industrial turntable designed particularly for use in foundries to receive mold boxes at a single point, and to transport the supported boxes to a different location for pouring or unloading from a single point at such location.

It is an additional object of the invention to provide unique wheeled supporting means for the turntable; said means including a plurality of ground engaging wheels, one of which is a caster wheel which is fitted with a pivoted manipulating handle of substantial length.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 2 is a side elevation, partly in section, of the turntable.

Figure 3 is an enlarged fragmentary sectional elevation of the spindle mount between the turntable platform and the wheeled supporting base.

Figure 1:
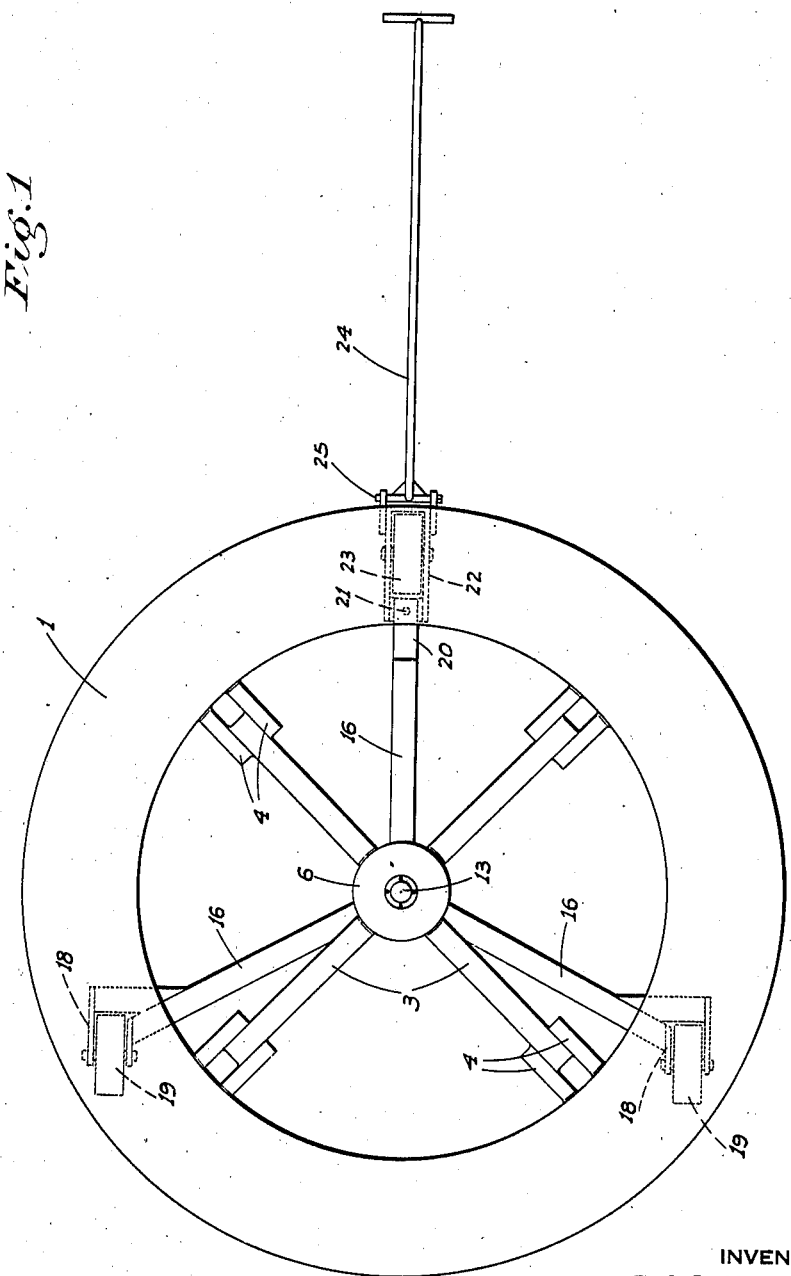
Figure 1 is a plan view of the improved portable industrial turntable.

Referring now more particularly to the characters of reference on the drawings, the apparatus comprises a relatively large annular or ring-like turntable platform 1 which is disposed horizontally, and which includes stiffening flanges 2 depending from both the outer and inner periphery thereof.

A plurality of circumferentially spaced radial spokes 3, preferably four in number, are disposed within the annular platform 1 and fixed at their outer ends between spaced attachment fingers 4 which project rigidly and inwardly from the adjacent flange 2. At their inner ends spokes 3 abut against and are secured in connection with a hub 5; a rigid connection being assured by the use of circular gusset plates 6 both above and below the spokes, the inner peripheral portions of said gusset plates engaging shoulders 7 on the hub 5.

A vertical spindle 8 extends from a point some distance below hub 5 upwardly therethrough, said spindle having a radial shoulder 9 which engages an anti-friction thrust bearing 10 seated in the lower end of the hub. Another anti-friction bearing 11 surrounds the spindle adjacent the upper end of the hub, and an adjustable retaining nut 12 prevents axially upward movement of the hub relative to the spindle. A closure cap 13 is fitted on the upper end of the hub and encloses the upper end of the spindle and the retaining nut thereon.

The lower end of the spindle is arranged in connection with the wheeled turntable supporting frame or base, which includes a vertical sleeve 14 into which the lower end of the spindle 8 projects, such portion of the spindle being pinned to the sleeve by a cross pin 15.

A plurality of circumferentially spaced radially extending spokes 16, preferably three in number, are secured at their inner ends on sleeve 14, the connection therewith being strengthened by circular gusset plates 17 similar to plates 6.

The spokes 16 are horizontal and terminate short of the outer periphery of the turntable platform 1, all of such spokes except one being formed at the end with a horizontal fork 18 between which a supporting wheel 19 is journaled; the axis of said supporting wheels 19 being disposed parallel to each other and at right angles to the remaining spoke 16. Such remaining spoke is formed at its outer end with a vertically disposed clevis 20 between which is pivoted a vertical spindle 21 carried on the inner end of a horizontal and radially outwardly projecting yoke 22. A wheel 23 is journaled between the arms of the yoke.

A relatively long pull handle 24 is pivoted at its inner end to the outer end of the yoke 22, as at 25, for vertical swinging movement. As is clearly shown in Figs. 1 and 2, the wheels 19 and the wheel 23 are disposed directly under the annular turntable platform 1, thus being protected against damage, should heavy objects fall either outwardly or inwardly therefrom. Also, the wheels being disposed between the platform flanges 2 and always clearing the same, said wheels may be relatively large while maintaining the platform quite low, as is desirable.

In use, the above described turntable can be readily and manually moved from place to place, and steered, by means of the pull handle 24. While the apparatus is well suited to many types of industrial use, it is of especial value for use in foundries, as mold boxes may be loaded onto the turntable from a single point, the turntable and its load then moved to another location, and the mold boxes poured or removed at such other location and from a single point.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A portable turntable comprising an annular platform, a hub therefor, spokes radiating from the hub and rigidly connected with the platform, a vertical spindle having its upper end portion projecting into said hub, an antifriction thrust bearing between said spindle portion and hub, other spokes secured in connection with the radiating from the spindle below and spaced from the platform, and ground engaging wheels on the outer ends of said other spokes.

2. A portable turntable comprising an annular platform, a hub therefor, spokes radiating from the hub and rigidly connected with the platform, a vertical spindle having its upper end portion projecting into said hub, an antifriction thrust bearing between said spindle portion and hub, a sleeve about the spindle below the turntable, means securing the sleeve on said spindle in non-turning relation, spokes secured on and radiating from said sleeve, and ground engaging wheels on the outer ends of said spokes.

3. Industrial apparatus comprising a low hung base, a horizontal circular turntable of relatively large diameter disposed above but relatively close to the ground and wholly overlying said base, means rotatably mounting the turntable on the base, said base including a plurality of spokes radiating from a hub, ground engaging wheels journaled on said spokes at their outer ends, said wheels being disposed under the turntable but closely adjacent its periphery, one of said wheels having a swivel mount, and a handle connected with said swivel mount and projecting therefrom outwardly in clearance relation to and from below the turntable.

4. An industrial apparatus comprising a base including radiating spokes, a turntable turnably mounted on the base and including an annular band-like platform, concentric stiffening flanges depending from the radially outer and inner edges of the platform, and spokes radiating from the center of the turntable and connected to the radially innermost flange; and wheels mounted on the base spokes and disposed in the radial space between said flanges whereby said wheels may be of sufficient diameter to project upwardly past the lower edge of the flanges while enabling the platform to remain relatively low.

ROBERT G. LE TOURNEAU.